INVENTORS
A. B. Jones
H. W. Fairbairn
By
ATTORNEYS

United States Patent Office 3,144,731
Patented Aug. 18, 1964

3,144,731
MODEL VEHICLES
Arthur Baxter Jones, East Cowes, Isle of Wight, and Howard W. Fairbairn, Dallington, England, assignors to The Mettoy Company Limited, London, England, a British company
Filed Aug. 7, 1961, Ser. No. 129,718
2 Claims. (Cl. 46—201)

The present invention relates to model vehicles which can be moved by hand over a fairly level surface.

The primary object of the present invention is to provide a model vehicle of novel construction which can be moved by hand over a fairly level surface either along a straight course, or, if desired, along an arcuate course without the use of any steering gear.

A preferred form of the invention is described below by way of example with reference to the accompanying drawings, in which.

Figure 1:
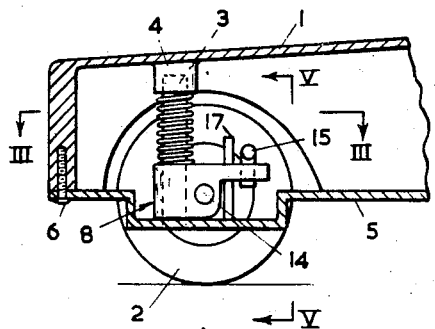
FIGURE 1 is a partial vertical section through the longitudinal axis of a model vehicle constructed in accordance with the invention showing the front end portion of the vehicle.
Figure 2:
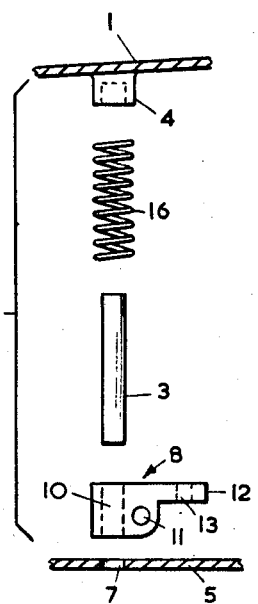
FIGURE 2 is an exploded view showing some of the component parts of the vehicle.
Figure 3:
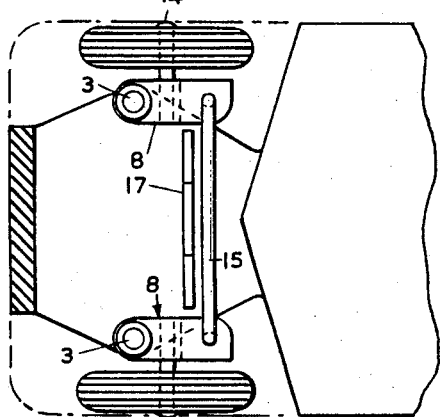
FIGURE 3 is a sectional plan view taken along the line III—III of FIGURE 1.

The drawings show the forward end of model vehicle which comprises a body 1, and a pair of supporting wheels 2, 2 mounted for steering movement about individual spaced axes provided by bearing rods 3, 3 which are supported in bosses 4, 4 formed integrally with the body. A bottom plate 5 is secured to the body as for example by screws or other means 6, and has apertures 7 which receive the lower ends of bearing rods 3, 3. A castoring bracket 8 is slidably mounted on each of the rods 3 for axial and angular movement relative thereto. Each castoring bracket is provided with an upwardly extending aperture 10 and a transverse horizontal aperture 11, and is formed with a rearwardly extending lug 12 having an aperture 13 therethrough. The aperture 10 slidably receives bearing rod 3, aperture 11 receives an axle pin 14, while aperture 13 rotatably receives one end of a connecting link 15 which serves to inter-connect the wheels to co-relate the steering movement thereof, the wheels being rotatably mounted on the outer ends of axle pins 14 for rotation about transverse horizontal axes. Each castoring bracket 8 is urged resiliently downwardly from the vehicle body by a coil compression spring 16 surrounding bearing rod 3 and acting against boss 4.

A vertically disposed cam plate 17 is fixedly secured to the bottom plate 5 and is formed with cam faces 18, 18 which slope upwardly towards the centre of the vehicle body.

Figure 4:
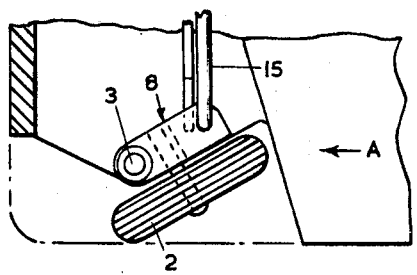
FIGURE 4 is a view similar to a part of FIGURE 3 but with certain component parts in different relative positions.
Figure 6:
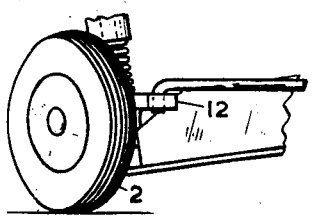
FIGURE 6 is a view in the direction of arrow A of FIGURE 4.
Figure 5:
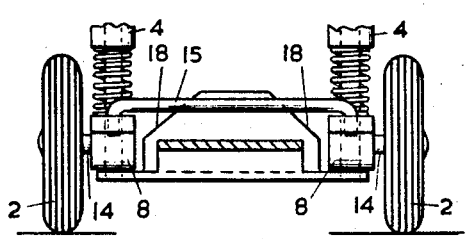
FIGURE 5 is a sectional view taken along the line V—V of FIGURE 1.

With the arrangement described above, the model vehicle is rendered steerable by the application of slight manual pressure on the body in a lateral and slightly downward direction. FIGURES 4 and 6 show the relative positions which various component parts have assumed in response to a manual pressure acting towards the left hand side of the vehicle. As the wheels move from their central position, in which they direct the vehicle along a straight course, the lug 12 of the left hand castoring bracket engages the adjacent cam face 18 and the interaction between the lug and the cam face causes axial movement of the castoring bracket along the bearing rod 3 against the restoring action of spring 16. When the manual pressure causing the steering movement of the wheels is removed, the spring acts to urge the wheels back towards their central position.

It is to be appreciated that the front wheels of the vehicle are separately movable along their respective vertical axes against the action of the springs so that independent sprung suspension of these wheels is obtained.

We claim:
1. A model vehicle comprising a body, a pair of spaced upright pivots on said body, a wheel supporting member mounted on each of said pivots, said member being free to oscillate about the axis of said pivot and to move axially along said axis, a vehicle supporting wheel rotatably mounted on each supporting member, a connecting member interconnecting said supporting members for movement in unison about said axes independently of any steering gear, a spring urging each of said supporting members downwardly along the axis of said pivot, whereby said body is resiliently supported on said wheels, and a cam fixed to said body, said cam being engageable by said wheel supporting members to deflect one of said supporting members upwardly along said axis, against the action of its respective spring, when said supporting members move from a central position about said pivots, said springs tending to return said supporting members to the central position.

2. A model vehicle comprising a body, a pair of spaced upright rods secured to the body, a castoring bracket slidably mounted on each rod for turning movement thereabout and sliding movement therealong, a supporting wheel rotatably mounted on each bracket, an apertured lug extending rearwardly of each bracket, a connecting rod having opposite end portions which engage said apertured lugs, the said rod connecting the brackets for steering movement in unison about said rods, a coil compression spring surrounding each of said rods, each positioned above the respective bracket and urging the said bracket downwardly, relative to the body, along the said rod, and a vertically disposed cam plate secured to the body, extending transversely thereof to the rear of the said spaced rods, the cam plate having opposed inwardly and upwardly sloping cam edges, each said edge being positioned inwardly of one of said lugs and arranged to be engaged thereby when the respective bracket turns in one direction from a central position, the interaction between said cam edge and said lug causing said bracket to move upwardly along said rod to compress said spring, whereby said spring tends to return said bracket to a central position.

References Cited in the file of this patent
UNITED STATES PATENTS

| | | |
|---|---|---|
| 693,962 | Fox et al. | Feb. 25, 1902 |
| 731,174 | Glen | June 16, 1903 |
| 959,978 | Wattles | May 31, 1910 |
| 2,888,778 | Carter | June 2, 1959 |

FOREIGN PATENTS

| | | |
|---|---|---|
| 632,339 | Great Britain | Nov. 21, 1949 |